Jan. 8, 1935. W. L. MORRISON 1,986,940
AUTOMOBILE DOOR
Filed Aug. 25, 1933 6 Sheets-Sheet 1
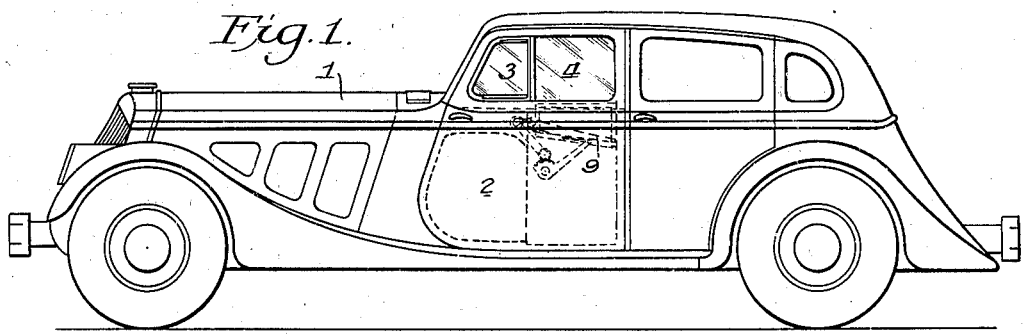
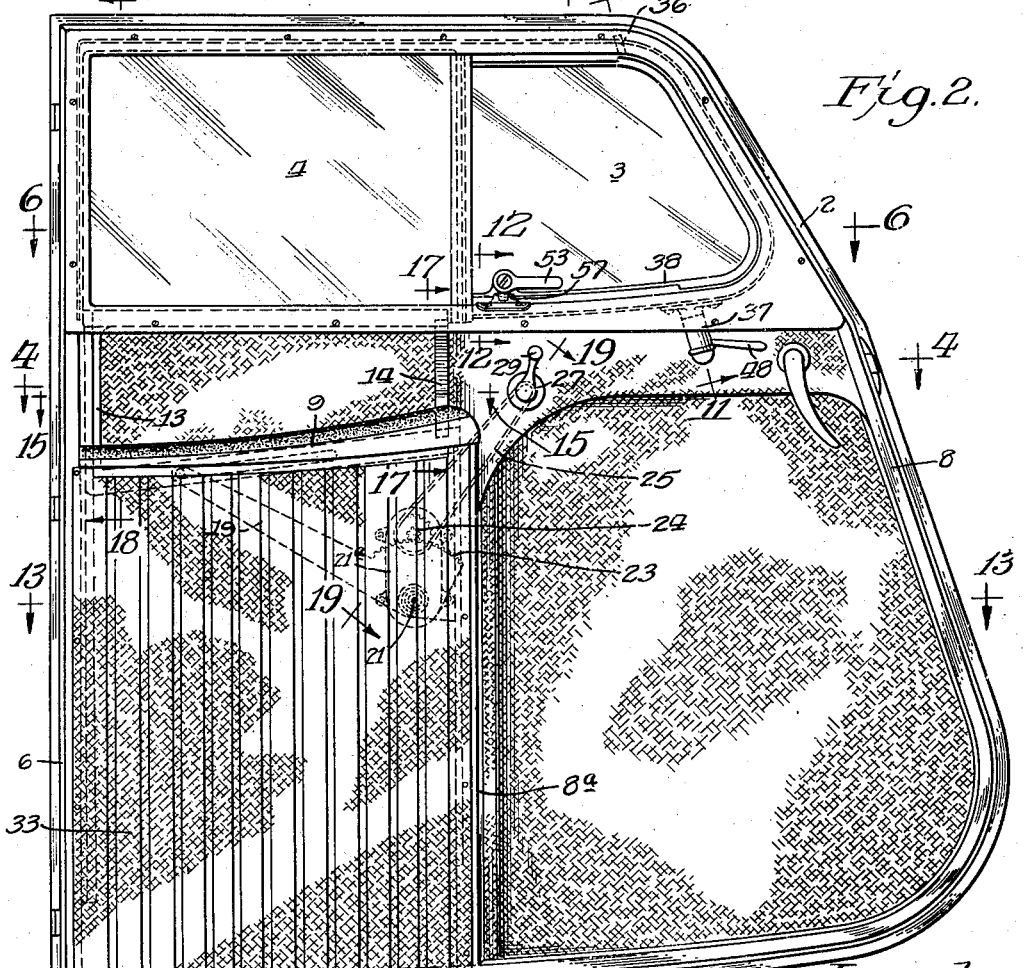

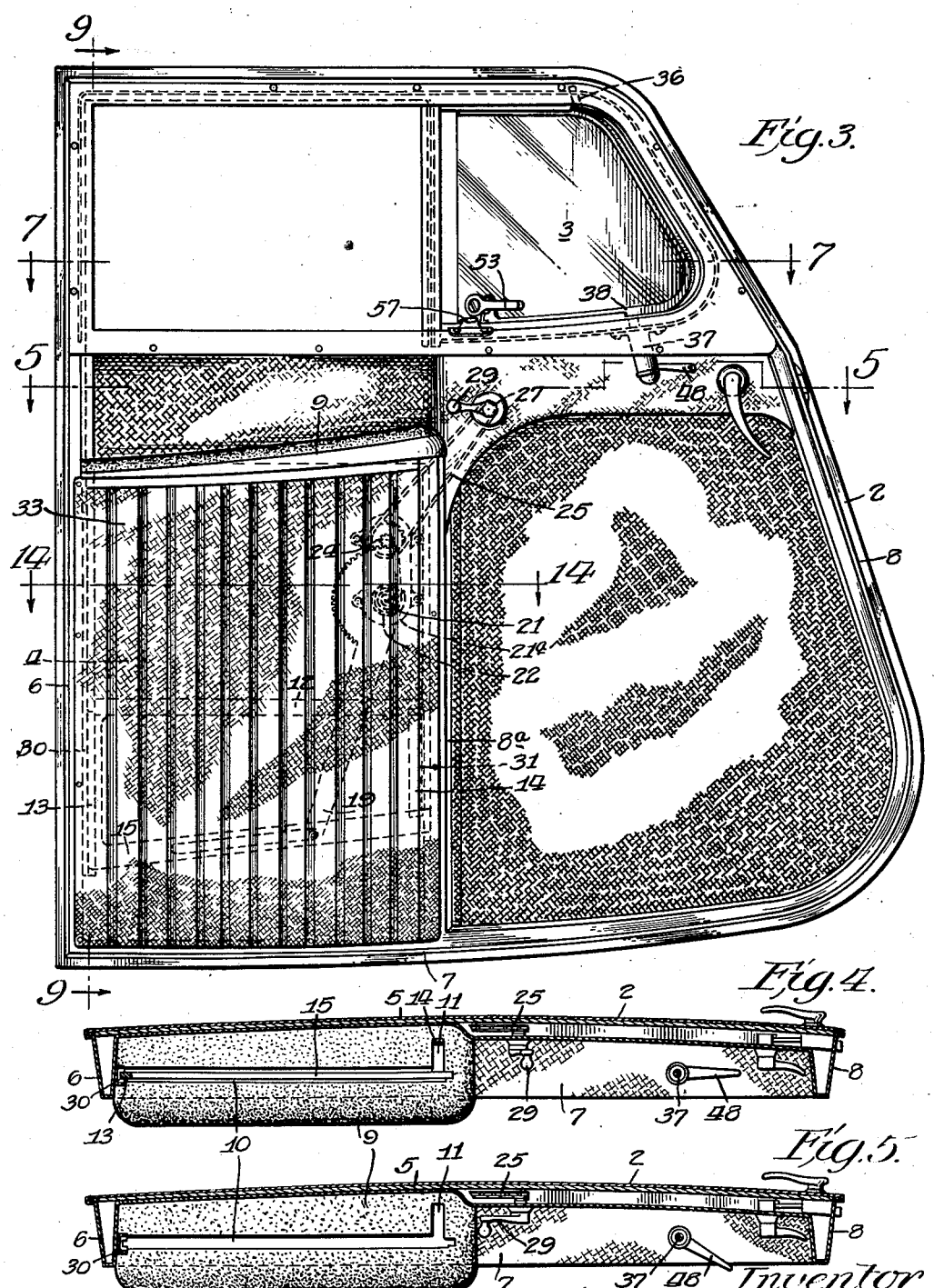

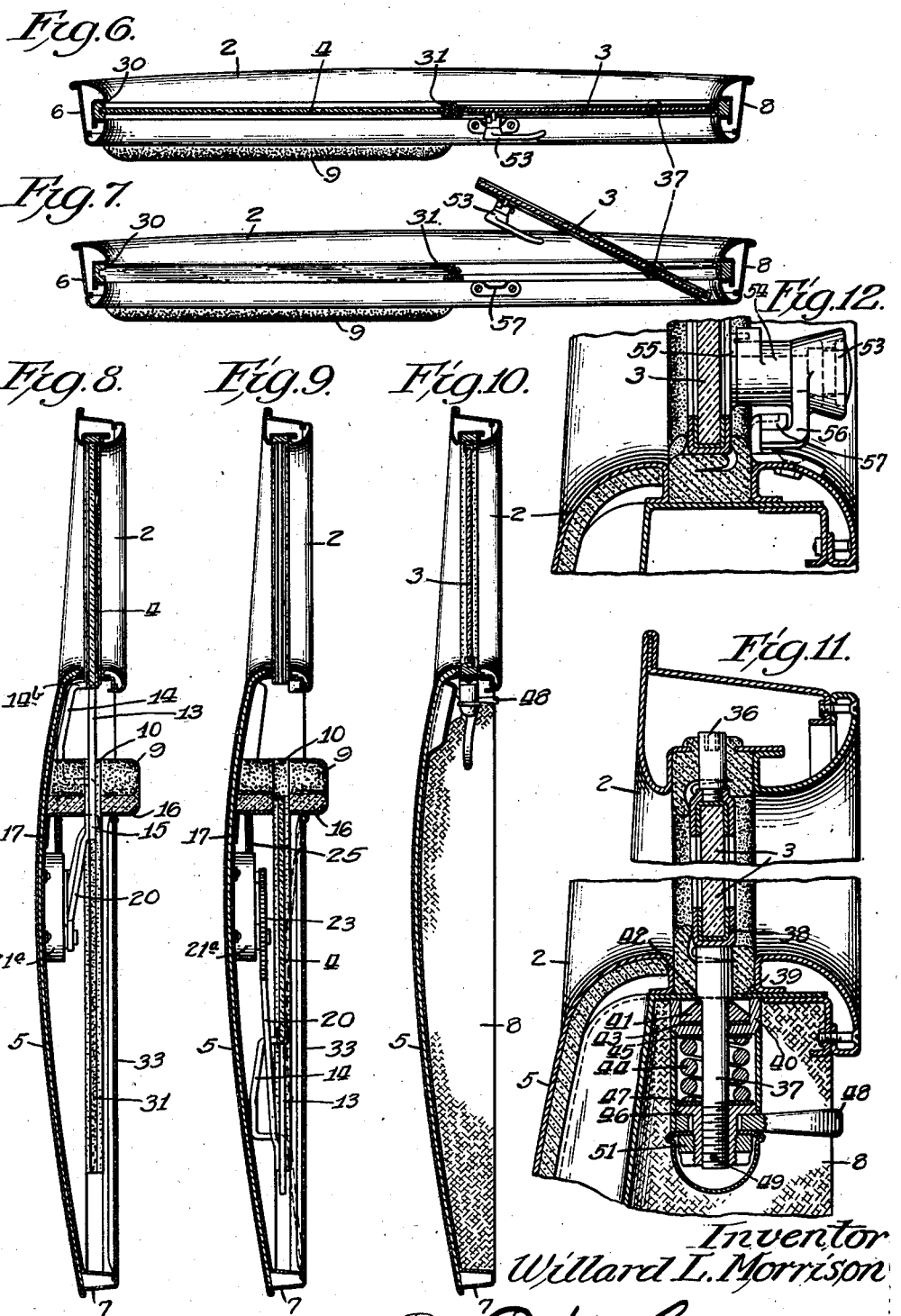

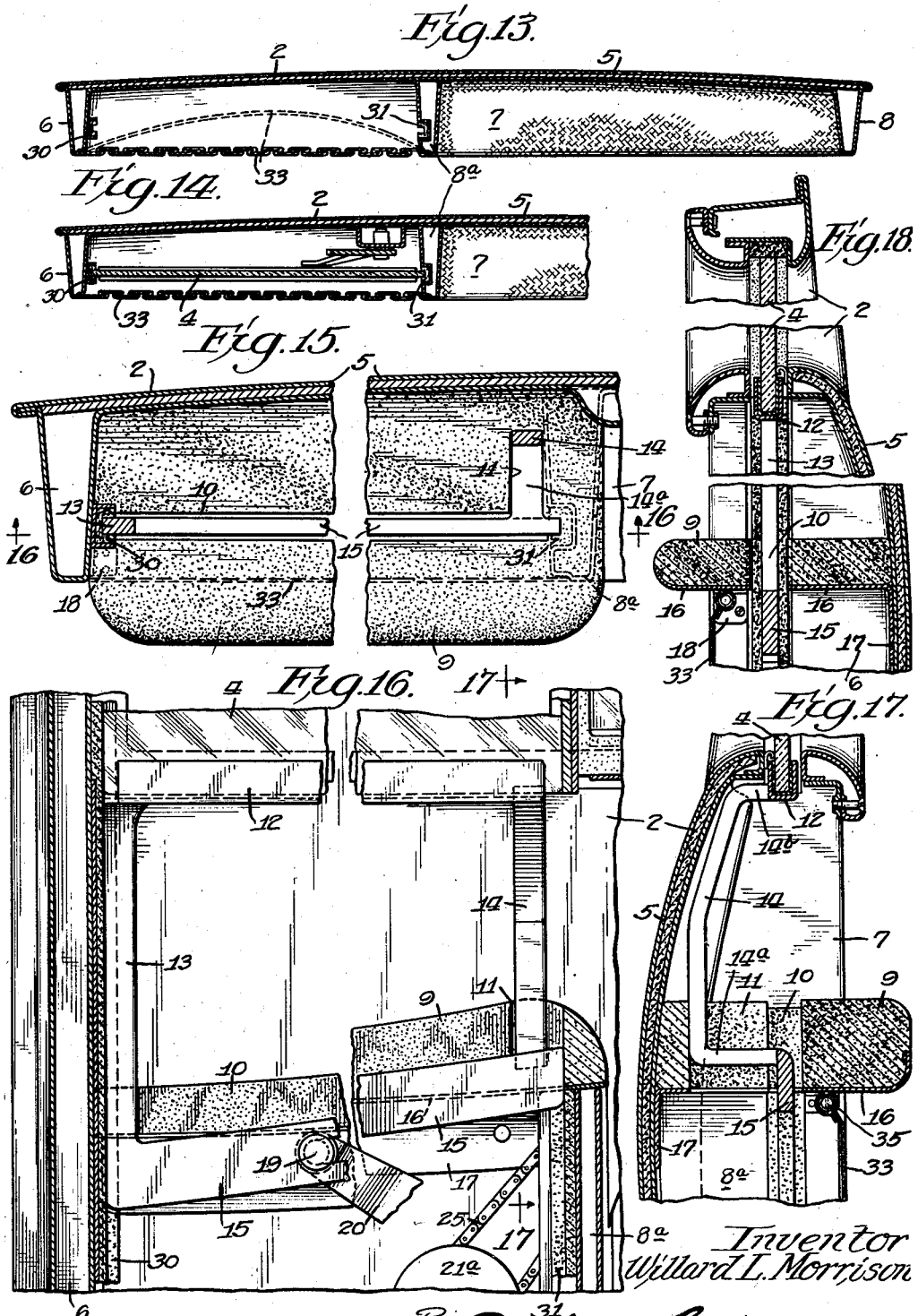

Jan. 8, 1935.  W. L. MORRISON  1,986,940
AUTOMOBILE DOOR
Filed Aug. 25, 1933  6 Sheets-Sheet 5
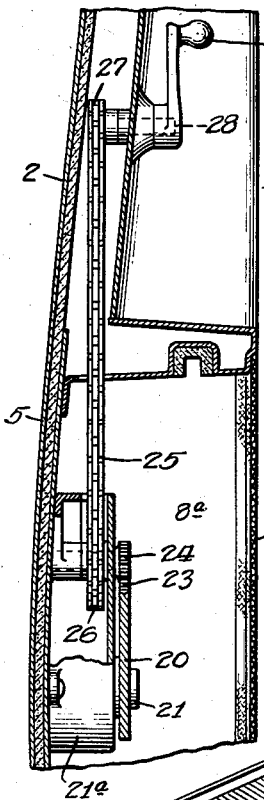
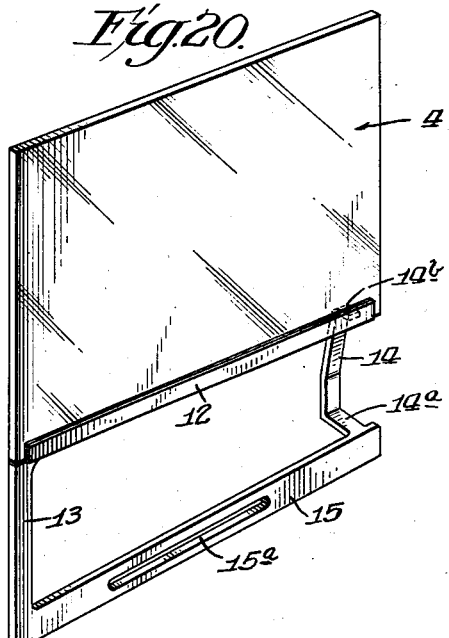
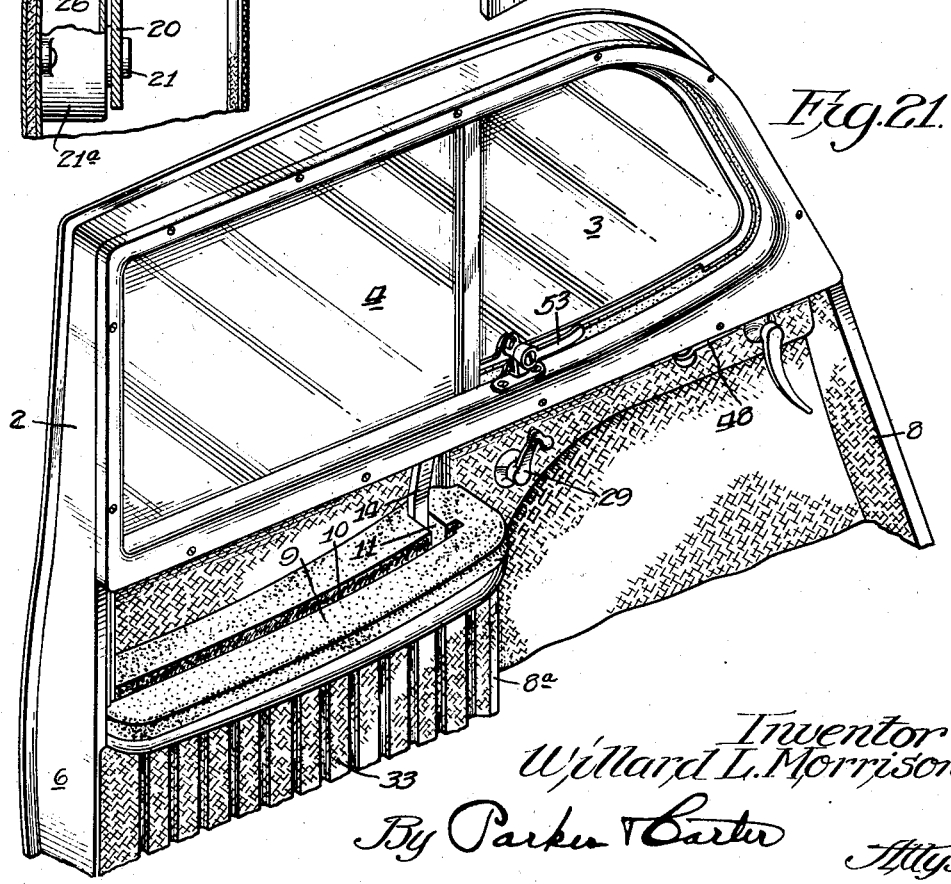
Inventor
Willard L. Morrison
By Parker & Carter
Attys.

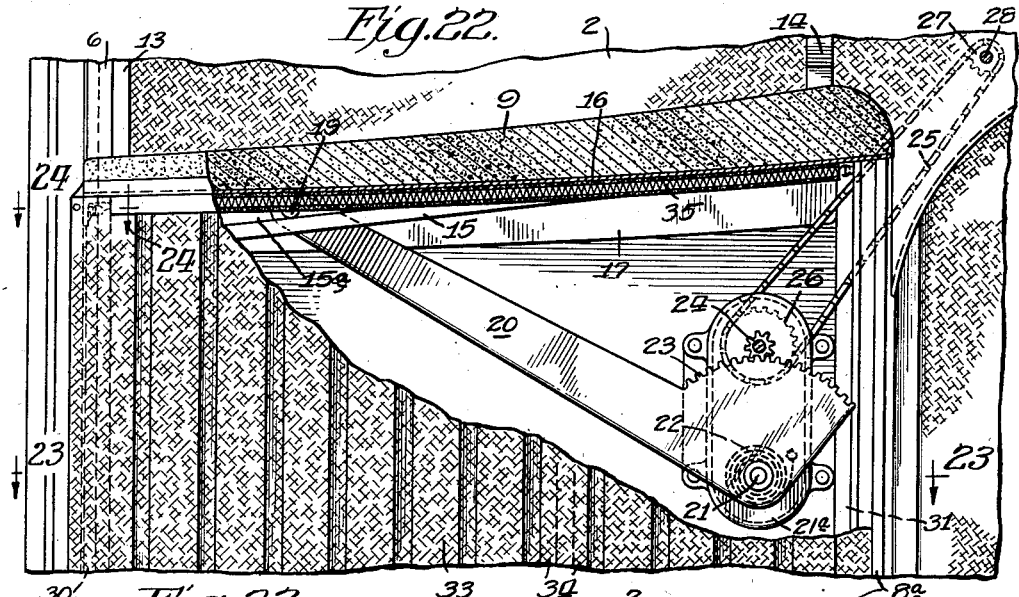
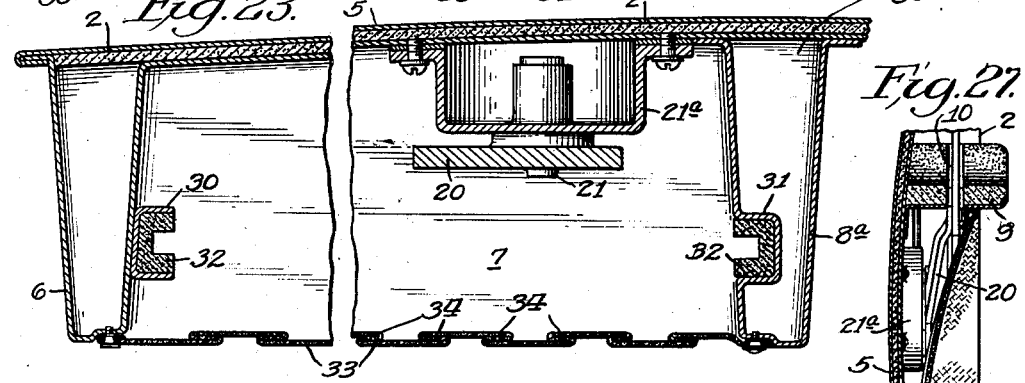
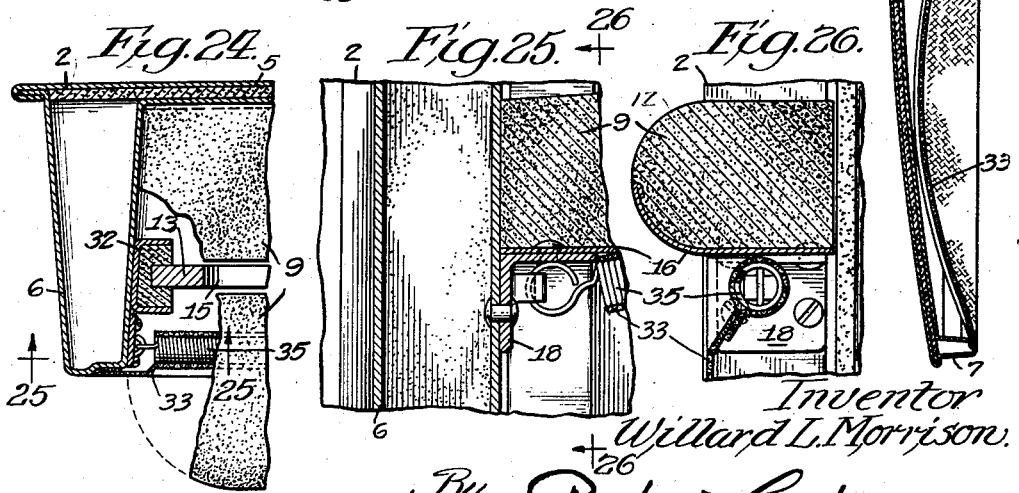

Patented Jan. 8, 1935

1,986,940

UNITED STATES PATENT OFFICE 1,986,940

AUTOMOBILE DOOR

Willard L. Morrison, Lake Forest, Ill.

Application August 25, 1933, Serial No. 686,674

12 Claims. (Cl. 296—44)

This invention relates to automobile doors, and has for its object to produce a new and improved door of this description. The invention has as a further object to provide an automobile door with a sliding window and an arm rest that does not interfere with the sliding of the window.

The invention has as a further object to provide an automobile door with a sliding window and a flexible wall behind which the window is moved when in its down position.

The invention has as a further object to provide an automobile door having a sliding window section and a pivoted window section with a simple and effective means for moving the pivoted window section to various angular positions.

The invention has other objects which are more particularly pointed out in the accompanying description.

Referring now to the drawings:

Figure 1 is a view of an automobile having a door embodying one form of the invention;

Fig. 2 is an enlarged view showing the inside of the door with the windows in their closed position;

Fig. 3 is a view similar to Fig. 2 with the sliding window in its down position;

Fig. 4 is a sectional view taken on line 4—4 of Fig. 2;

Fig. 5 is a sectional view taken on line 5—5 of Fig. 3;

Fig. 6 is a sectional view taken on line 6—6 of Fig. 2;

Fig. 7 is a sectional view taken on line 7—7 of Fig. 3;

Fig. 8 is a sectional view taken on line 8—8 of Fig. 2;

Fig. 9 is a sectional view taken on line 9—9 of Fig. 3;

Fig. 10 is a sectional view taken on line 10—10 of Fig. 2;

Fig. 11 is an enlarged sectional view taken on line 11—11 of Fig. 2 with parts omitted.

Fig. 12 is an enlarged sectional view taken on line 12—12 of Fig. 2;

Fig. 13 is a sectional view taken on line 13—13 of Fig. 2;

Fig. 14 is a sectional view taken on line 14—14 of Fig. 3;

Fig. 15 is an enlarged sectional view taken on line 15—15 of Fig. 2 with parts broken away;

Fig. 16 is an enlarged sectional view taken on line 16—16 of Fig. 15, with parts broken away;

Fig. 17 is a sectional view taken on line 17—17 of Fig. 16;

Fig. 18 is an enlarged sectional view taken on line 18—18 of Fig. 2 with parts broken away;

Fig. 19 is an enlarged sectional view taken on line 19—19 of Fig. 2;

Fig. 20 is a perspective view of the sliding window and its supporting member;

Fig. 21 is a perspective view of the upper part of the inside of the door;

Fig. 22 is a view of middle portion of the inside of the door;

Fig. 23 is an enlarged sectional view taken on line 23—23 of Fig. 22 with parts broken away;

Fig. 24 is an enlarged sectional view taken on line 24—24 of Fig. 22;

Fig. 25 is a sectional view taken on line 25—25 of Fig. 24;

Fig. 26 is a sectional view taken on line 26—26 of Fig 25;

Fig. 27 is a sectional view through the lower part of the door like Fig. 8 with the sliding window up.

Like numerals refer to like parts throughout the several figures.

I have illustrated one form of the invention in the drawings wherein Fig. 1 shows an automobile 1 with a door 2 having a pivoted window section 3 and a sliding window section 4 which slides up and down. The door, below the window sections, has a single wall constituting the outer wall 5 having the inwardly projecting frame members 6, 7 and 8 and the middle frame member 8a. Below the window section 4 on the inside of the door is an arm rest 9 of the proper height for the arm of the occupant of the car. This arm rest is arranged so as not to interfere with the up and down motion of the sliding window 4. In the construction shown the arm rest 9 is arranged to permit the window section 4 to slide therethrough. For the purpose the arm rest has a slot 10 extending therethrough with an angular portion 11. The window section 4 has a supporting device clearly shown in Fig. 20, which comprises an enlarging part 12 which is connected with the window section, and which has the downwardly extending side members 13 and 14 connected together by the cross member 15. The arm rest 9 is supported in any desired manner. As herein shown it is supported at one end on the frame member 8a. An angular bracket member has a part 16 which engages the underside of the arm rest and a part 17 which is attached to the wall 5 of the door. The other end of the arm rest is supported by the frame member 6 in any desired manner as by the angular bracket 18 (see Fig. 15).

When the sliding window section is in its up position, as shown in Fig. 2, the cross member 15 is in a position that does not interfere with the resting of the arm on the arm rest. As herein shown this cross member is below the top of the arm rest when the window section 4 is up as shown in Figs. 2 and 17. The side member 14 is bent outwardly (see Fig. 17), so that it does not interfere with the resting of the arm on the arm rest. In the construction shown it has the angular portion 14a which passes into and through the angular portion 11 of slot 10. There is also an angular portion 14b which passes through this slot. The side piece 14 may also be bent outwardly near its middle as shown in Fig. 14. The window section slides through the slot 10 in the arm rest when it is slid downwardly, the upper part thereof being below the top of the arm rest 9 as shown in Fig. 3.

Some suitable mechanism is provided for sliding the window section 4. As herein shown Figs. 2 and 22 the cross member 15 is provided with a slot 15a into which is received a projection 19 on the arm 20 pivoted at 21 on the bracket 21a which has associated with it the coil spring 22. Arm 21 has a toothed section 23, see Fig. 2, the teeth of which are engaged by the teeth of a pinion 24 rotatably mounted in position. This gear is operated in any desired manner as by a chain 25 which engages the sprocket wheel 26 connected with the pinion 24. The chain 25 engages a sprocket wheel 27 on a shaft 28 operated by a crank 29 on the inside of the door, when the window section 4 is up (Fig. 2) and the crank is turned in one direction the window section is moved down to the position shown in Fig. 3, the opposite rotation of the crank moves the window to its up position. The window does not interfere with the arm rest either when it is up or down the side. The window slides in guideways 30 and 31 see Fig. 23 which are lined with a suitable packing 32 to prevent rattling.

Below the window section 4, and on the inside of the door is a flexible piece 33 which is preferably elastic or expansible. Any suitable material may be used. I have shown the piece as being pleated having the pleats or folds 34 at suitable intervals see Figs. 22 and 23.

This piece acts to cover up the window section; it is attached at its lower edge to the frame member 7, see Fig. 27 and at its upper edge with the coil spring 35, see Figs. 22 and 26. This construction holds it taut but yet leaves it free to be moved outwardly as shown in Fig. 27. This piece 33 is so made and supported that it normally takes a position substantially like that shown in Figs. 8 and 9.

When the window section 4 is down it hides it from view. When the window section is up it will move outwardly when a portion of the body of the occupant of the automobile presses on it, thus giving more inside space and increasing the inside width of the automobile body.

The window section 3 is pivoted at the top by the pivot 36 and at the bottom by the pivot 37 which is preferably a friction pivot. One form of this pivot is illustrated in Fig. 11; in this construction the pivot 37 is fastened to the frame piece 38 of the window 3 and passes through the window 39. Any suitable means may be used for providing a resistance to the movement of the pivot. As herein shown pivot 37 passes through a stationary member 40 on one side of which there is a piece 41 which is engaged by the shoulder 42 on the pivot 37. A friction washer 43 on the pivot 36 is located between the parts 40 and 41. A spring 44 on the other side of the member 40 engages a friction washer 45 between the spring and the member 40. A nut 46 on the threaded end of the pivot 37 has a friction washer 47 between it and the spring 44. This nut when tightened compresses the spring 44 and causes the friction washers to be compressed against their associated parts so as to resist the movement of the pivot 37 and the window section 3. I have illustrated a simple and effective means for moving the window 3 to different angular positions, consisting of a handle 48, which may be connected with the pivot in any desired manner. As herein shown this connection is made by interlocking teeth on the handle and nut; the handle having a hole through which the nut passes as shown in Fig. 11. This handle may be used to turn the nut 46 to tighten it. When the nut is properly tightened it and the handle may be fastened to the pivot 37 by the pin 49. If desired the handle may be held in connection with the teeth of the nut by the nut 51. The handle 48 projects into the automobile and it will be seen that the window 3 may be easily and quickly moved to any desired angular position by taking hold of the handle and moving it. The window 3 may be locked in its closed position by the locking device consisting of the handle 53 rotatably mounted upon the part 54. Connected with the frame member 55 on the window 3, a movable locking member 56 is connected with the handle 53 and when the handle is rocked moves under the fixed locking member 57 on the inside of the automobile.

I have described one door but it is to be understood that the other doors may be constructed in the same manner as I have here pointed out.

I have described in detail a particular construction illustrating the invention, but it is of course evident that the parts may be varied without departing from the spirit of the invention as embodied in the claims hereto appended and I do not limit myself to the particular construction shown.

I claim:—

1. An automobile door comprising an outer wall, with a window opening associated therewith, a vertically sliding window in said window opening, an arm rest connected with said door beneath said window opening having portions on opposite sides of the window and means for sliding said window up and down between said portions of the arm rest.

2. An automobile door comprising an outer wall, with a window opening associated therewith, a vertically sliding window in said window opening, guideways associated with said window along which it slides, an arm rest connected with said door beneath said window opening having a portion which extends to said outer wall, said arm rest being so formed as to permit the window to move up and down, and moving mechanism for moving said window up and down.

3. An automobile door comprising an outer wall, with a window opening associated therewith, a vertically sliding window in said window opening, and a pleated flexible wall below said window opening, the sliding window being received between said pleated flexible wall and said outer wall when in its down position whereby the pleated flexible wall may be moved outwardly by the body of the occupant when the window is up to increase the inside useable width of the automobile at that place.

4. An automobile door comprising an outer wall, with a window opening associated therewith, a vertically sliding window in said window opening, and an elastic inner wall below said window opening which is free to move toward said outer wall and beyond the vertical plane of the window when pressure is applied thereto and the window is up, whereby the useable inside width of the automobile is increased at that place.

5. An automobile door comprising an outer wall with a window opening associated therewith, an arm rest connected with said door below said window opening, said arm rest extending across to said outer wall and having a window receiving slot therein, a vertically sliding window in said window opening, and means for sliding said window up and down through said slot.

6. An automobile door comprising an outer wall with a window opening associated therewith a vertically sliding window therein, an arm rest connected with said door below said window opening, a slot associated with said arm rest through which said window passes when moved to its down position and means for moving said window through said slot so that when the window is in its maximum up and down positions, it is out of the way of the arm of the occupant resting on said arm rest.

7. An automobile door comprising an outer wall, with a window opening associated therewith, a vertically sliding window in said window opening, a support therefor having a bottom member spaced apart from the lower edge of said window, an arm rest connected with said door having its upper face so positioned that part of an arm resting thereon may project through the space in said support between said bottom member and the lower edge of said window.

8. An automobile door comprising an outer wall, with a window opening associated therewith, a vertically sliding window in said window opening, a support therefor having a bottom member spaced apart from the lower edge of said window, an arm rest connected with said door having its upper face so positioned that part of an arm resting thereon may project through the space in said support between said bottom member and the lower edge of said window and a raising and lowering mechanism connected with the bottom member of said window support.

9. An automobile door comprising an outer wall, with a window opening associated therewith, a vertically sliding window in said window opening, a support therefor having a bottom member spaced apart from the lower edge of said window, two side members connecting the bottom member with said window, one of said side members being bent outwardly.

10. An automobile door comprising an outer wall, with a window opening associated therewith, a vertically sliding window in said window opening, a support therefor having a bottom member spaced apart from the lower edge of said window, two side members connecting the bottom member with said window, one of said side members being bent outwardly, an arm rest connected with said door below said window opening, a slot associated with said arm rest through which said window slides and having an angular portion for said outwardly bent side member.

11. An automobile door comprising an outer wall with a window opening associated therewith; a vertically sliding window in said opening and a flexible expansible inner wall below said window opening which conceals said window, when the window is down, a portion of which may be moved toward the outer wall, past the vertical plane of the window, when the window is up, to increase the effective inside width of the automobile.

12. An automobile door comprising an outer wall with a window opening associated therewith; a vertically sliding window in said opening and a flexible expansible inner wall below a portion of said window opening, said flexible expansible wall free to be moved to engage said outer wall when pressure is applied thereto when the window is up, whereby the effective inside width of the automobile is increased at that place.

WILLARD L. MORRISON.